United States Patent
Lu et al.

(10) Patent No.: US 11,084,027 B2
(45) Date of Patent: Aug. 10, 2021

(54) THREE-DIMENSIONAL COMPOSITE MATERIAL, PREPARATION METHOD THEREOF AND APPLICATION THEREOF IN REMOVAL OF WATER POLLUTANTS BY VISIBLE LIGHT CATALYTIC DEGRADING

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 251 days.

(21) Appl. No.: 16/396,607

(22) Filed: Apr. 26, 2019

(65) Prior Publication Data

US 2019/0329233 A1 Oct. 31, 2019

(30) Foreign Application Priority Data

Apr. 28, 2018 (CN) .......................... 201810405098.7

(51) Int. Cl.
  *B01J 37/32* (2006.01)
  *B01J 35/00* (2006.01)
  (Continued)

(52) U.S. Cl.
  CPC ............. *B01J 35/004* (2013.01); *B01J 27/19* (2013.01); *B01J 37/0072* (2013.01); *B01J 37/04* (2013.01);
  (Continued)

(58) Field of Classification Search
  CPC ............ C10M 169/048; C10M 137/02; C10M 169/04; C10M 129/54; C10M 129/74; C10M 109/00; C10M 161/00; C10M 145/14; C10M 139/00; C10M 141/12; C10M 2215/28; C10M 2203/1025; C10M 2219/106; C10M 2207/289; C10M 2219/046; C10M 2215/08; C10M 2207/283; C10M 2290/02; C10M 223/049; C10M 2227/061; C10M 2207/144; C10M 2209/084; C10M 2290/00;
  (Continued)

(56) References Cited

FOREIGN PATENT DOCUMENTS

CN 102247876 B * 6/2013

* cited by examiner

*Primary Examiner* — Walter D. Griffin
*Assistant Examiner* — Cameron J Allen
(74) *Attorney, Agent, or Firm* — SZDC Law P.C.

(57) ABSTRACT

A method of preparing a three-dimensional composite material includes the following steps: preparing polystyrene by soap-free emulsion polymerizing, obtaining polystyrene opal by a vertical deposition method, synthesizing MoP IO (molybdenum phosphide inverse opal), and compounding with quantum points CdS, so as to obtain a novel inorganic composite material, namely cadmium sulfide quantum dot-compounded MoP IO. The preparation method has the advantages that the MoP IO is prepared first, and the MoP IO is of a three-dimensional cyclic pore structure and has the photonic band gap feature, so that the MoP IO has better catalysis effect in light catalysis in comparison with that of common porous material; the MoP IO is compounded with the cadmium sulfide quantum dots, so that the light absorbing ability is enhanced, and the composite material capable of absorbing the visible light is obtained.

15 Claims, 4 Drawing Sheets

(51) Int. Cl.
*B01J 27/19* (2006.01)
*B01J 37/00* (2006.01)
*B01J 37/04* (2006.01)
*B01J 37/06* (2006.01)
*B01J 37/08* (2006.01)
*C02F 1/30* (2006.01)
*C02F 101/34* (2006.01)

(52) U.S. Cl.
CPC ............... *B01J 37/06* (2013.01); *B01J 37/08* (2013.01); *B01J 37/32* (2013.01); *C02F 1/30* (2013.01); *C02F 2101/345* (2013.01); *C02F 2305/10* (2013.01)

(58) Field of Classification Search
CPC ....... C10M 2207/262; C10M 2223/049; C07F 5/04; C10N 2060/14; C10N 2020/04; C10N 2030/02; C10N 2030/06; C10N 2030/52; C10N 2010/04; C10N 2040/045; C10N 2020/02; C10N 2030/45; C10N 2030/04

See application file for complete search history.

THREE-DIMENSIONAL COMPOSITE MATERIAL, PREPARATION METHOD THEREOF AND APPLICATION THEREOF IN REMOVAL OF WATER POLLUTANTS BY VISIBLE LIGHT CATALYTIC DEGRADING

This application claims priority to Chinese Patent Application No.: 201810405098.7, filed on Apr. 28, 2018, which is incorporated by reference for all purposes as if fully set forth herein.

FIELD OF THE INVENTION

The invention relates to the technical field of inorganic composite materials, in particular to a three-dimensional composite with visible-light photodegradation of organic pollutants, the preparation method and effective removal of phenol in water.

TECHNICAL BACKGROUND

Phenol wastewater is a common industrial waste water. It is usually toxic and difficult to biodegrade. In recent years, it is necessary to find a safe, effective and environmentally friendly method to treat phenol wastewater. The traditional physical adsorption, extraction and chemical precipitation have some disadvantages, which are limited in practical applications. Generally, the effect of physical adsorption is poor, and chemical precipitation is easy to produce secondary pollution. The photocatalytic technology is the most effective method to treat phenol wastewater in recent years for its characteristics of green, energy saving and high efficiency.

Photocatalytic reaction refers to the separation of photogenerated carriers in semiconductor materials under a certain wavelength of light. The photogenerated electrons and holes are combined with ions or molecules to produce reactive radicals with oxidizing or reducing properties, which can degrade organic molecules into carbon dioxide or other small molecules. In 1972, Honda et al. used $TiO_2$ as photocatalytic electrodes to produce hydrogen from water. Recently, researches based on semiconductor photocatalyst develop rapidly. Nowadays, the photocatalytic semiconductors such as ZnO, $TiO_2$, CdS and $SnO_2$ have been widely studied. Cadmium sulfide is widely used for photocatalyst for its suitable valence band and conduction band. Cadmium sulfide quantum dots can regulate the band structure by changing the size of cadmium sulfide, and have shorter charge carrier transmission distance and reduced carrier recombination. Therefore, CdS quantum dots are ideal photocatalysts. However, the phenomenon of photo-corrosion affects its wide application. It is very important to inhibit the photo-corrosion phenomenon of CdS quantum dots.

SUMMARY OF THE INVENTION

The purpose of the present invention is to provide a three-dimensional composite that degrades organic pollutants under visible light illumination. The cheap and easily available cocatalyst of the invention has solved the high cost of precious metals such as gold, platinum and palladium, especially the excellent catalytic activity, which is very important in the application of photocatalytic reaction.

In order to achieve the above purpose, the specific technical proposal of the invention is as follows:

A preparation method of a three-dimensional composite material, comprising the following steps:

(1) preparing polystyrene opal template by using polystyrene spheres and FTO glass as raw materials;

(2) immersing the polystyrene opal template in an aqueous solution containing molybdenum source and phosphorus source to prepare a molybdenum phosphide inverse opal photocatalyst;

(3) preparing oil phase cadmium sulfide quantum dots using 1-octadecene, oleic acid, cadmium oxide and sulfur powder as raw materials; then preparing an aqueous phase cadmium sulfide quantum dot using the oil phase cadmium sulfide quantum dots, 3-mercaptopropionic acid and tetramethylammonium hydroxide as raw materials;

(4) mixing the aqueous phase cadmium sulfide quantum dot with molybdenum phosphide inverse opal stone photocatalyst, calcining to obtain the three-dimensional composite material.

The present invention also discloses a method for removing water pollutants, comprising the following steps:

(1) preparing polystyrene opal template by using polystyrene spheres and FTO glass as raw materials;

(2) immersing the polystyrene opal template in an aqueous solution containing molybdenum source and phosphorus source to prepare a molybdenum phosphide inverse opal photocatalyst;

(3) preparing oil phase cadmium sulfide quantum dots using 1-octadecene, oleic acid, cadmium oxide and sulfur powder as raw materials; then preparing an aqueous phase cadmium sulfide quantum dot using the oil phase cadmium sulfide quantum dots, 3-mercaptopropionic acid and tetramethylammonium hydroxide as raw materials;

(4) mixing the aqueous phase cadmium sulfide quantum dot with molybdenum phosphide inverse opal stone photocatalyst, calcining to obtain the three-dimensional composite material;

(5) adding the three-dimensional composite material to the polluted water and irradiating it to complete the removal of water pollutants.

The present invention also discloses a preparation method of a molybdenum phosphide inverse opal photocatalyst, comprising the following steps:

(1) preparing polystyrene opal template by using polystyrene spheres and FTO glass as raw materials;

(2) immersing the polystyrene opal template in an aqueous solution containing molybdenum source and phosphorus source to prepare a molybdenum phosphide inverse opal photocatalyst.

In the present invention, in the step (1), the particle diameter of the polystyrene spheres is 280 nm; and the preparation method of the polystyrene spheres is, after mixing styrene, polyvinylpyrrolidone, potassium peroxodisulfate and deionized water, nitrogen is blown in for 1 h, then reacted at 70° C. for 24 h, after the reaction is finished, the cake is filtered off, and the filtrate is washed with centrifugal water, the resulting solid is lyophilized to obtain polystyrene spheres.

In the step (2), the molybdenum source is ammonium molybdate or ammonium dimolybdate, and the phosphorus source is diammonium hydrogen phosphate, ammonium hydrogen phosphate or phosphoric acid, the polystyrene opal template is immersed in an aqueous solution containing a molybdenum source and a phosphorus source, and then dried and calcined to obtain a molybdenum phosphide inverse opal photocatalyst.

Preferably, the molar ratio of the molybdenum source to the phosphorus source is 1; calcination is calcined in air at 400 to 500° C. for 2 hours, after natural cooling, and then calcined at 600 to 700° C. for 2 hours in a mixed hydrogen/argon atmosphere; in said hydrogen/argon mixed atmosphere, the volume fraction of hydrogen is 3% to 10%.

In the present invention, in the step (3), the temperature for preparing the oil phase cadmium sulfide quantum dots is 250° C., the reaction time is 2 to 10 min; and the condition for preparing aqueous phase cadmium sulfide quantum dot is stirring in the dark for 12 hours at room temperature.

The molar ratio of 1-octadecene, oleic acid, cadmium oxide and sulfur powder is 15:(0.45~0.5):1:0.5; the molar ratio of the oil phase cadmium sulfide quantum dots, 3-mercaptopropionic acid and tetramethylammonium hydroxide is 1:(5.5~6):12.

In the present invention, in the step (4), the mixture is mixed by grinding; calcination is carried out at 200° C. for 2 to 4 hours under nitrogen.

Molybdenum phosphide (MoP), as a kind of metal phosphide, has the advantages of stable catalytic activity, cheap and easy to obtain, and its good conductivity can receive electrons in the photocatalytic reaction, thus effectively reducing the recombination rate of photoelectron electrons and holes. Inverse opal is a three-dimensional ordered structure with high specific surface area and porosity. Its unique slow photon effect can increase the effective light path and improve the interaction between the photocatalyst and the incident light.

The invention first prepared the molybdenum phosphide inverse opals (MoP IO), and then prepared Cadmium sulfide quantum dots deposited molybdenum phosphide inverse opals (CdS/MoP IO), which is a three-dimensional composite material. The specific preparation method can be as follows:

1. Preparation of molybdenum phosphide inverse opal photocatalyst (MoP IO): preparation of molybdenum phosphide inverse opal includes the following steps:

(1) Polystyrene spheres with a particle size of about 280 nm was used and polystyrene opal template was prepared using FTO glass.

(2) Molybdenum source and phosphorus source are used as precursors, both are taken in the beaker, dissolved in deionized water, stirring at room temperature for 30 min, and recorded as solution A. The prepared polystyrene opal template is soaked in solution A, and dried at 50~70° C., the dried precursor template is calcined at 400~500° C. in air for 2 h, the heating rate is 1~2° C./min. After natural cooling, photocatalysts were then calcined at 600~700° C. for 2 hours in the mixture atmosphere of hydrogen/argon. The volume fraction of hydrogen was 3%~10% in the hydrogen/argon atmosphere. The phosphide molybdenum inverse opal (MoP IO) was obtained.

2. The preparation of cadmium sulfide quantum dots deposited molybdenum phosphide inverse opal (CdS/MoP IO): Cadmium sulfide quantum dots deposited molybdenum phosphide inverse opal, including the following steps: (1) 1-octadecene, oleic acid and cadmium oxide were added to the three neck flask and heated to 280° C. 1-octadecene and sulfur powder were added to tube and treated with ultrasound for 30 min to form a colorless transparent solution. The liquid in the tube was removed with a syringe and quickly injected into the three neck flask. The reaction was maintained for 2~10 min at 250° C. The solution after the reaction was cooled quickly and transferred to the separation funnel, and was washed with methanol-hexane mixed solvent for three times, and the supernatant was added to acetone. The precipitate was centrifugated and washed with acetone-hexane mixed solvent. Cadmium sulfide quantum dots were transferred to methanol solvent. 3-mercaptopropionic acid and tetramethylammonium hydroxide were added to adjusted pH to 10. Water-soluble CdS quantum dots were obtained by stirring for 12 hours. (2) CdS quantum dots and molybdenum phosphide inverse opals are evenly stirred in the mortar, and calcined at 200° C. for 2~4 hours to obtain cadmium sulfide quantum dots deposited molybdenum phosphide inverse opal.

In the present invention, in step (5) the pollutant is phenol, and illumination is treated by 300 W xenon light.

The invention also discloses three dimensional composite, the phosphide phosphide inverse opals photocatalyst, the application of the molybdenum phosphide inverse opals photocatalyst in the preparation of the three-dimensional composite material, and the application of the three-dimensional composite in visible-light photodegradation of pollutants in water.

Compared with the prior art, the invention has the following advantages:

1. Cadmium sulfide quantum dots, as an important type of II-IV semiconductor, have appropriate band gap and high photoelectron electron hole recombination rate. Cadmium sulfide quantum dots deposited molybdenum phosphide can effectively raise the separation efficiency of photogenerated electrons and holes. The photocatalytic activity was effectively improved and the phenomenon of photo corrosion was reduced.

2. The invention discloses the preparation of Molybdenum phosphide inverse opals (MoP IO), which fills the precursors with the help of capillary force in the gap of opal templates, the templates are removed by sintering method, and the reduced gas calcination is applied to obtain the three-dimensional structure. Molybdenum phosphide inverse opal is a porous nanomaterial, which has large surface area and excellent mass transfer performance compared with the traditional nanoparticles. This three-dimensional structure is beneficial to the rapid diffusion of reactants in the photocatalytic reaction. The slow photon effect of the three-dimensional pore structure of molybdenum phosphide inverse opal can enhance the interaction of photons and photocatalyst and effectively improve the photocatalytic efficiency.

3. This invention effectively combine cadmium sulfide quantum dots with molybdenum phosphide inverse opal by grinding, which can increase the dispersion of cadmium sulfide quantum dots on the framework of inverse opals without destroying the skeleton of the molybdenum phosphide inverse opal.

DETAILED DESCRIPTION OF THE INVENTION

The invention will be made a further explanation according to the following figures and the specific implementations.

Implementation 1:

Synthesis of Monodispersed Polystyrene Spheres.

100 mL deionized water, 12.18 g styrene and 0.5 g polyvinylpyrrolidone (K30) were added to 250 mL flask, and stirred for 30 min at room temperature. 0.3 g potassium persulfate was dissolved in 20 mL deionized water, and the above solution is added to the flask. Nitrogen was pumped for 1 h and then the system was reacted at 70° C. for 24 h. After the reaction was finished, the bulk was filtered. The filtrate was washed with deionized water by centrifuging and then freeze drying to obtain solids.

Implementation 2:

Synthesis of Polystyrene Opal Templates.

Polystyrene powder was dispersed in deionized water with concentration of 0.125 wt %. 1 mL polystyrene dispersing solution and 1 mL deionized water were added in weighing bottle. The clean FTO glass was inserted into the weighing bottle above, and placed at a vacuum drying box for 45° C. After the evaporation of water, the surface of the FTO glass was covered with color film. Finally, the opal template was placed at a 60° C. oven for 2 h to consolidate the connection of polystyrene spheres.

Implementation 3:

Synthesis of Molybdenum Phosphide Inverse Opal.

Figure 1:
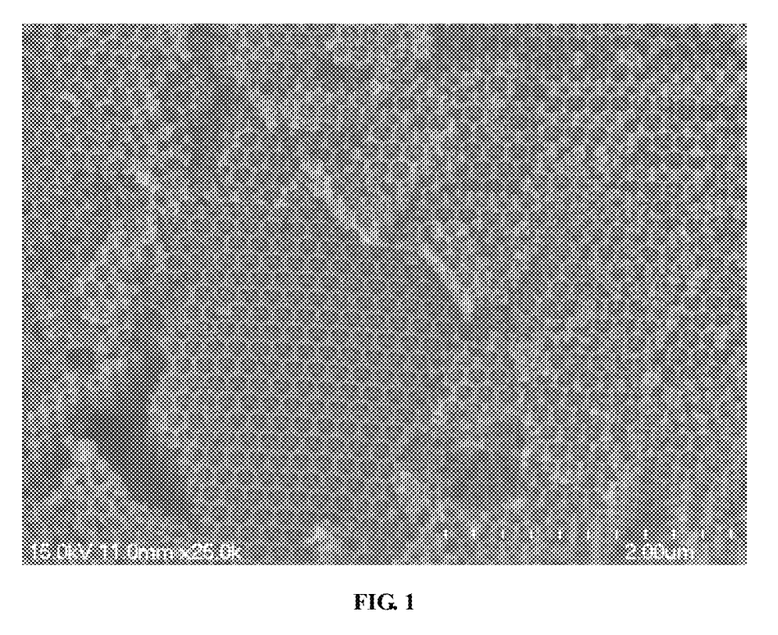
FIG. 1 is the SEM image of MoP IO in implementation 3.

0.1766 g $(NH_4)_6Mo_7O_{24}\cdot 4H_2O$ and 0.1321 g $(NH_4)_2HPO_4$ were dissolved in 10 mL deionized water, the solution was stirred for 30 min and indexed as A solution. PS opals were first infiltrated into 1 mL of A solution at 60° C. for 1 h and calcined at 500° C. for 2 h. Then the FTO glass were calcined at 700° C. under a $H_2$ flow (3% hydrogen/argon atmosphere) for 2 h with a heating rate of 2° C./min. As can be seen from FIG. 1, the structure of molybdenum phosphide inverse opals is homogeneously.

Implementation 4:

Synthesis of Cadmium Sulfide Quantum Dot Deposited Molybdenum Phosphide Inverse Opal.

0.1280 g CdO and 1.3293 g oleic acid was added to 34.6506 g 1-octadecene and heated to 280° C. 0.0160 g sulfur was dissolved in 3.95 g 1-octadecene and injected into the hot solution above. The mixture was maintained at 250° C. for 10 minutes to grow CdS QDs and transferred to the separation funnel, and was washed with methanol-hexane mixed solvent for three times, and the supernatant was added to acetone. The precipitate was centrifugated and washed with acetone-hexane mixed solvent. Cadmium sulfide quantum dots were transferred to methanol solvent. 0.1 mL 3-mercaptopropionic acid and 8.4521 g tetramethylammonium hydroxide were added to adjusted pH to 10. Water-soluble CdS quantum dots were obtained by stirring for 12 hours.

Figure 2:
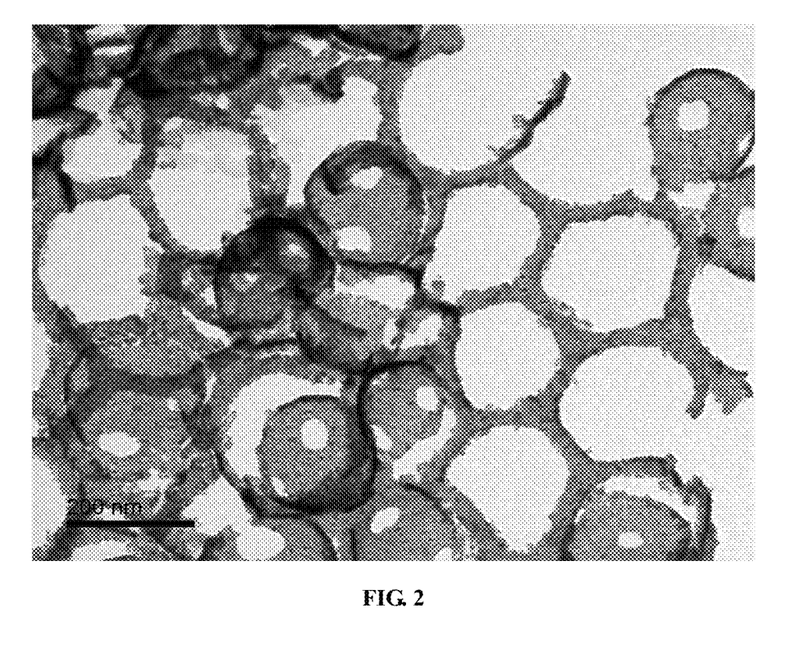
FIG. 2 is the TEM image of CdS/MoP IO in implementation 4.

0.2 g CdS quantum dots and 0.3 g molybdenum phosphide inverse opals are evenly stirred in the mortar, and calcined at 200° C. for 2 hours to obtain cadmium sulfide quantum dots deposited molybdenum phosphide inverse opal. As can be seen from FIG. 2, CdS QDs are homogeneously distributed on the framework of inverse opal and form closely contacted nanocomposites.

Implementation 5:

Synthesis of Cadmium Sulfide Quantum Dot Deposited Molybdenum Phosphide Inverse Opal.

Figure 3:
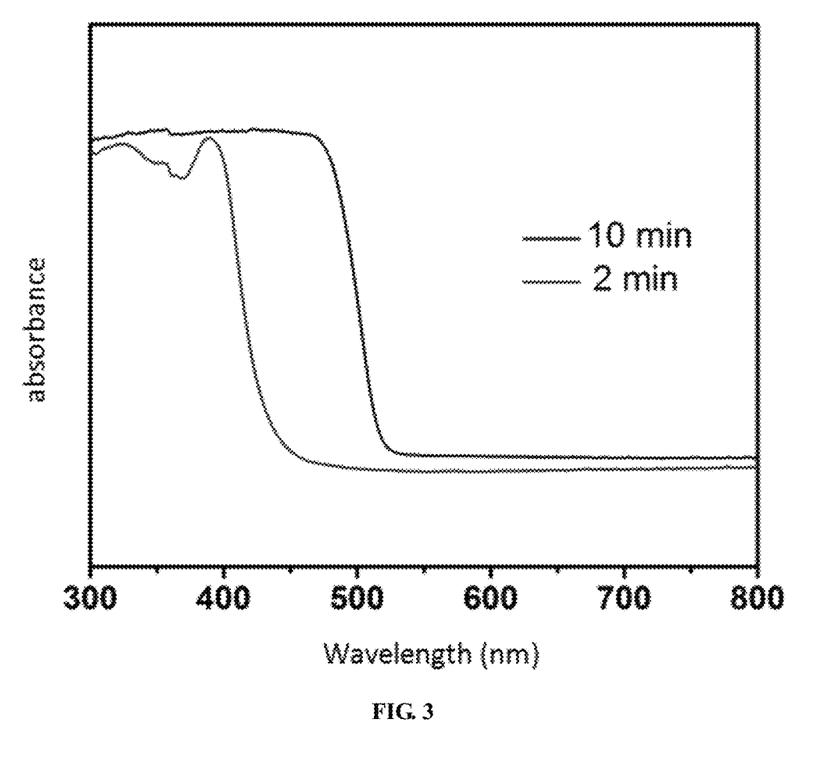
FIG. 3 is the ultraviolet visible spectrum of CdS QDs in implementation 4.

0.1280 g CdO and 1.3293 g oleic acid was added to 34.6506 g 1-octadecene and heated to 280° C. 0.0160 g sulfur was dissolved in 3.95 g 1-octadecene and injected into the hot solution above. The mixture was maintained at 250° C. for 2 minutes to grow CdS QDs and transferred to the separation funnel, and was washed with methanol-hexane mixed solvent for three times, and the supernatant was added to acetone. The precipitate was centrifugated and washed with acetone-hexane mixed solvent. Cadmium sulfide quantum dots were transferred to methanol solvent. 0.1 mL 3-mercaptopropionic acid and 8.4521 g tetramethylammonium hydroxide were added to adjusted pH to 10. Water-soluble CdS quantum dots were obtained by stirring for 12 hours. 0.2 g CdS quantum dots and 0.3 g molybdenum phosphide inverse opals are evenly stirred in the mortar, and calcined at 200° C. for 2 hours to obtain cadmium sulfide quantum dots deposited molybdenum phosphide inverse opal. Compared with the implementation 4, the reaction time for preparing CdS quantum dots is shorter in this implementation, so the particle size of quantum dots are smaller. The ability of light absorbance of two quantum dots are different because of quantum size effect. As shown in FIG. 3, the quantum dots with a reaction time of 10 min are more capable of absorbing visible light. Prolong the reaction time, the crystal growth is faster and the reaction system appears nanorods, and the photocatalytic activity is weakened.

Implementation 6:

Photocatalytic Activity of CdS/MoP IO Evaluated by Degradation of Phenol.

Figure 4:
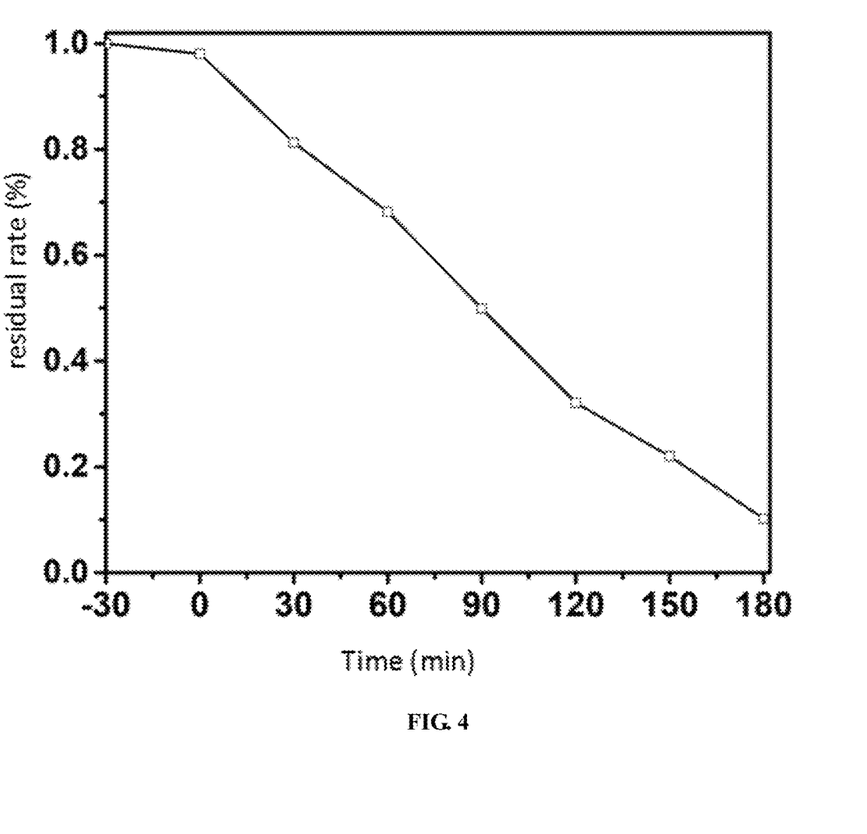
FIG. 4 shows the phenol photodegradation curve for CdS/MoP IO in implementation 6.

The 20 mg CdS/MoP IO in implementation 4 is placed in the 50 mL solution of phenol at a concentration of 10 mg/L. The suspension was stirred in dark for 30 min to achieve absorption-desorption equilibrium. And then the suspension was irradiated by a 300 W Xenon lamp source (with a light filter >420 nm) and 3 mL suspension was collected and centrifuged every half hour to analyze the concentration of phenol. The phenol concentrations were determined by high-performance liquid chromatography and the concentration of phenol in the corresponding water samples was obtained by reference to the standard curve. FIG. 4 shows the relationship between the residual rate of phenol and the time. It can be seen from the diagram that the removal rate of phenol in aqueous solution is more than 90% after adding CdS/MoP IO photocatalyst and applying light for 180 min. When the phenol concentration was reduced to 5 mg/L, the removal rate of phenol in aqueous solution was 98% when the photocatalytic reaction time was 120 min under the same experimental conditions.

Implementation 7:

Recycling Performance of CdS/MoP IO Evaluated by Degradation of Phenol.

Figure 5:
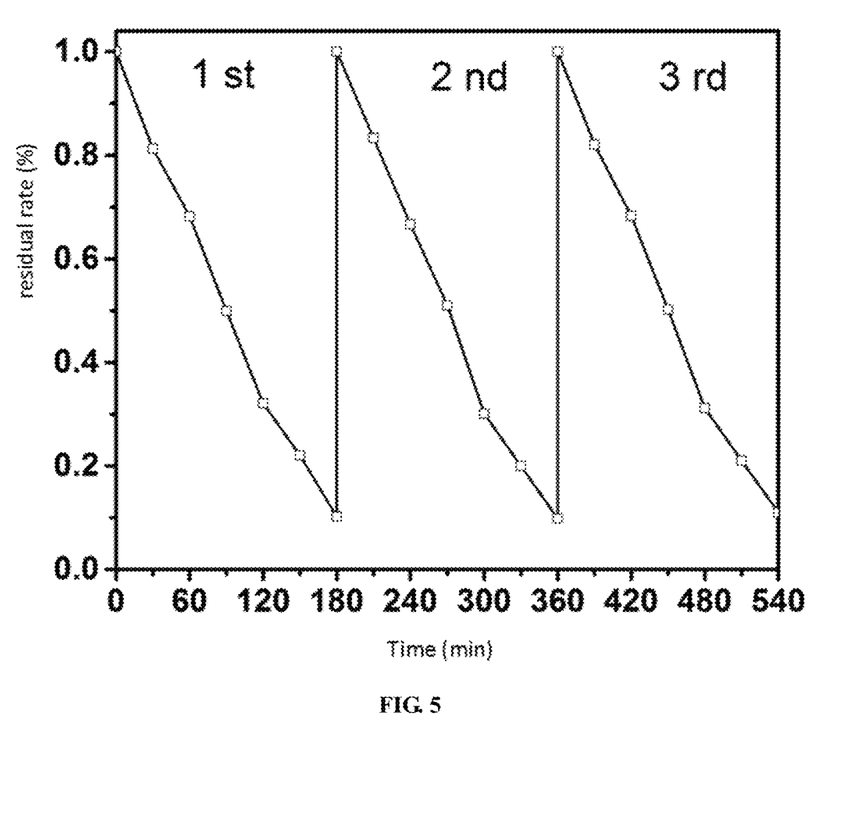
FIG. 5 shows the recycling performance of CdS/MoP IO towards phenol photodegradation in implementation 7.

The composite in the above implementation 6 was washed and dried in order of deionized water and 95% ethanol, and placed in a fresh 50 mL 10 mg/L phenol aqueous solution to recycle. The retention time was recorded by high performance liquid chromatography, and the standard curve was obtained to confirm the concentration of phenol in the corresponding water sample. This step was repeated 3 times. FIG. 5 shows the photocatalytic activity of CdS/MoP IO in repeated use for 3 times. It can be seen in the experiment that the composite maintains excellent photocatalytic performance, and the final removal efficiency of phenol in aqueous solution is more than 90%. Therefore, CdS/MoP IO can be reused and has good stability.

A three-dimensional ordered cadmium sulfide quantum dot deposited molybdenum phosphide inverse opal was prepared. When the photocatalyst is illuminated, due to the properties of molybdenum phosphide, the photogenerated electrons flow from the conduction band of cadmium sulfide to molybdenum phosphide, thus effectively inhibiting the recombination of charge carriers, reducing the photo corrosion effect of cadmium sulfide and improving the photocatalytic activity of cadmium sulfide.

What we claim is:

1. A preparation method of a three-dimensional composite material, comprising the following steps:
   (1) preparing polystyrene opal template by applying polystyrene spheres on an FTO (fluorine-doped tin oxide) glass;
   (2) immersing the polystyrene opal template in an aqueous solution containing molybdenum source and phosphorus source to prepare a molybdenum phosphide inverse opal photocatalyst;
   (3) preparing oil phase cadmium sulfide quantum dots by mixing 1-octadecene, oleic acid, cadmium oxide and sulfur powder; then preparing an aqueous phase cadmium sulfide quantum dot by mixing the oil phase cadmium sulfide quantum dots, 3-mercaptopropionic acid and tetramethylammonium hydroxide;
   (4) mixing the aqueous phase cadmium sulfide quantum dot with molybdenum phosphide inverse opal stone photocatalyst, calcining to obtain the three-dimensional composite material.

2. The method according to claim 1, wherein in the step (1), the particle diameter of the polystyrene spheres is 280 nm; and the preparation method of the polystyrene spheres is, after mixing styrene, polyvinylpyrrolidone, potassium peroxodisulfate and deionized water, nitrogen is blown in for 1 h, then reacted at 70° C. for 24 h, after the reaction is finished, a filter cake is filtered off, and a filtrate is washed with centrifugal water, the resulting solid is lyophilized to obtain polystyrene spheres.

3. The method according to claim 1, wherein in the step (2), the molybdenum source is ammonium molybdate or ammonium dimolybdate, and the phosphorus source is diammonium hydrogen phosphate, ammonium hydrogen phosphate or phosphoric acid, the polystyrene opal template is immersed in an aqueous solution containing a molybdenum source and a phosphorus source, and then dried and calcined to obtain a molybdenum phosphide inverse opal photocatalyst.

4. The method according to claim 3, wherein the molar ratio of the molybdenum source to the phosphorus source is 1; calcination is calcined in air at 400 to 500° C. for 2 hours, after natural cooling, and then calcined at 600 to 700° C. for 2 hours in a mixed hydrogen/argon atmosphere; in said hydrogen/argon mixed atmosphere, the volume fraction of hydrogen is 3% to 10%.

5. The method according to claim 1, wherein in the step (3), the temperature for preparing the oil phase cadmium sulfide quantum dots is 250° C., the reaction time is 2 to 10 min; and the condition for preparing aqueous phase cadmium sulfide quantum dot is stirring in the dark for 12 hours at room temperature; the molar ratio of 1-octadecene, oleic acid, cadmium oxide and sulfur powder is 15:(0.45~0.5):1:0.5; the molar ratio of the oil phase cadmium sulfide quantum dots, 3-mercaptopropionic acid and tetramethylammonium hydroxide is 1:(5.5~6):12; in the step (4), a mixture of the aqueous phase cadmium sulfide quantum dot with molybdenum phosphide inverse opal stone photocatalyst is mixed by grinding; calcination is carried out at 200° C. for 2 to 4 hours under nitrogen.

6. A method for removing water pollutants, comprising the following steps:
   (1) preparing polystyrene opal template by applying polystyrene spheres on an FTO (fluorine-doped tin oxide) glass;
   (2) immersing the polystyrene opal template in an aqueous solution containing molybdenum source and phosphorus source to prepare a molybdenum phosphide inverse opal photocatalyst;
   (3) preparing oil phase cadmium sulfide quantum dots by mixing 1-octadecene, oleic acid, cadmium oxide and sulfur powder; then preparing an aqueous phase cadmium sulfide quantum dot by mixing the oil phase cadmium sulfide quantum dots, 3-mercaptopropionic acid and tetramethylammonium hydroxide;
   (4) mixing the aqueous phase cadmium sulfide quantum dot with molybdenum phosphide inverse opal stone photocatalyst, calcining to obtain a three-dimensional composite material;
   (5) adding the three-dimensional composite material to the polluted water and irradiating it to complete the removal of water pollutants.

7. The method according to claim 6, wherein in the steps (5), the pollutant is phenol, and the irradiating is conducted by 300 W xenon light.

8. The method according to claim 6, wherein in the step (1), the particle diameter of the polystyrene spheres is 280 nm; and the preparation method of the polystyrene spheres is, after mixing styrene, polyvinylpyrrolidone, potassium peroxodisulfate and deionized water, nitrogen is blown in for 1 h, then reacted at 70° C. for 24 h, after the reaction is finished, a filter cake is filtered off, and a filtrate is washed with centrifugal water, the resulting solid is lyophilized to obtain polystyrene spheres.

9. The method according to claim 6, wherein in the step (2), the molybdenum source is ammonium molybdate or ammonium dimolybdate, and the phosphorus source is diammonium hydrogen phosphate, ammonium hydrogen phosphate or phosphoric acid, the polystyrene opal template is immersed in an aqueous solution containing a molybdenum source and a phosphorus source, and then dried and calcined to obtain a molybdenum phosphide inverse opal photocatalyst.

10. The method according to claim 9, wherein the molar ratio of the molybdenum source to the phosphorus source is 1; calcination is calcined in air at 400 to 500° C. for 2 hours, after natural cooling, and then calcined at 600 to 700° C. for 2 hours in a mixed hydrogen/argon atmosphere; in said hydrogen/argon mixed atmosphere, the volume fraction of hydrogen is 3% to 10%.

11. The method according to claim 6, wherein in the step (3), the temperature for preparing the oil phase cadmium sulfide quantum dots is 250° C., the reaction time is 2 to 10 min; and the condition for preparing aqueous phase cadmium sulfide quantum dot is stirring in the dark for 12 hours at room temperature; the molar ratio of 1-octadecene, oleic acid, cadmium oxide and sulfur powder is 15:(0.45~0.5):1:0.5; the molar ratio of the oil phase cadmium sulfide quantum dots, 3-mercaptopropionic acid and tetramethylammonium hydroxide is 1:(5.5~6):12; in the step (4), a mixture of the aqueous phase cadmium sulfide quantum dot with molybdenum phosphide inverse opal stone photocatalyst is mixed by grinding; calcination is carried out at 200° C. for 2 to 4 hours under nitrogen.

12. A preparation method of a molybdenum phosphide inverse opal photocatalyst, comprising the following steps:
   (1) preparing polystyrene opal template by applying polystyrene spheres on an FTO (fluorine-doped tin oxide) glass;
   (2) immersing the polystyrene opal template in an aqueous solution containing molybdenum source and phosphorus source to prepare a molybdenum phosphide inverse opal photocatalyst.

13. The method according to claim 12, wherein in the step (1), the particle diameter of the polystyrene spheres is 280 nm; and the preparation method of the polystyrene spheres is, after mixing styrene, polyvinylpyrrolidone, potassium peroxodisulfate and deionized water, nitrogen is blown in for 1 h, then reacted at 70° C. for 24 h, after the reaction is finished, a filter cake is filtered off, and a filtrate is washed with centrifugal water, the resulting solid is lyophilized to obtain polystyrene spheres.

14. The method according to claim 12, wherein in the step (2), the molybdenum source is ammonium molybdate or ammonium dimolybdate, and the phosphorus source is diammonium hydrogen phosphate, ammonium hydrogen phosphate or phosphoric acid, the polystyrene opal template is immersed in an aqueous solution containing a molybdenum source and a phosphorus source, and then dried and calcined to obtain a molybdenum phosphide inverse opal photocatalyst.

15. The method according to claim 14, wherein the molar ratio of the molybdenum source to the phosphorus source is 1; calcination is calcined in air at 400 to 500° C. for 2 hours, after natural cooling, and then calcined at 600 to 700° C. for 2 hours in a mixed hydrogen/argon atmosphere; in said hydrogen/argon mixed atmosphere, the volume fraction of hydrogen is 3% to 10%.

* * * * *